US006766382B1

(12) United States Patent
Madden et al.

(10) Patent No.: US 6,766,382 B1
(45) Date of Patent: Jul. 20, 2004

(54) METHOD OF INFORMATION TRANSFER USING OPTICAL ZONES

(75) Inventors: Robert B. Madden, Poughquag, NY (US); Karen P. Madden, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 09/605,731

(22) Filed: Jun. 28, 2000

(51) Int. Cl.[7] .............................................. G06F 15/16
(52) U.S. Cl. ...................... 709/246; 709/203; 348/525; 341/137; 710/72
(58) Field of Search ................................. 709/203, 246; 345/87, 99, 744, 864; 341/137; 348/441, 525; 708/111; 710/72

(56) References Cited

U.S. PATENT DOCUMENTS

| | | | |
|---|---|---|---|
| 3,993,861 A | | 11/1976 | Baer |
| 4,999,617 A | | 3/1991 | Uemura et al. |
| 5,488,571 A | * | 1/1996 | Jacobs et al. ............... 708/111 |
| 5,652,602 A | | 7/1997 | Fishman et al. |
| 5,742,260 A | | 4/1998 | Fishman et al. |
| 5,748,895 A | | 5/1998 | Shiff et al. |
| 5,923,885 A | * | 7/1999 | Johnson et al. ............. 717/176 |
| 5,931,764 A | | 8/1999 | Freeman et al. |
| 5,986,623 A | * | 11/1999 | Chiloyan et al. ............. 345/13 |
| 6,281,820 B1 | * | 8/2001 | Fields ........................ 341/137 |
| 6,483,906 B1 | * | 11/2002 | Iggulden et al. ....... 379/102.03 |

* cited by examiner

*Primary Examiner*—David Wiley
*Assistant Examiner*—Thomas J Mauro, Jr.
(74) *Attorney, Agent, or Firm*—Todd M.C. Li (57) ABSTRACT

A method of transmitting data from a host computer to a portable information device is disclosed. Optical pulses are displayed by illuminating an area of pixels, or optical zone, on a display monitor. Time series of optical pulses are displayed, including a bit stream that provides clocking information displayed within an optical zone concurrently with a data bit stream encoded using a standard encoding scheme (such as a serial or parallel transmission scheme or a combination thereof), and then detecting and downloading the bit stream data by using a suitably configured sensing device connected to a portable information device. If the display monitor is a color display monitor, brightness of each primary color may be used as an independent transmission channel. In addition, multiple optical zones may be used to transmit data, which allows the present invention to be used with monochrome display monitors. The use of a plurality of optical zones has the additional advantage of increasing the effective bandwidth of the data transmission. This method is portable and suitable for use on both CRT and LCD display devices.

16 Claims, 6 Drawing Sheets

METHOD OF INFORMATION TRANSFER USING OPTICAL ZONES

FIELD OF THE INVENTION

The present invention relates to the transfer of information to a portable client device and more particularly to a method of transferring data from a host computer system in which the data is displayed in the form of an optical bit stream on a display monitor connected to a host computer system and in which the optical bit stream is then detected and downloaded using an optical sensing device that is connected to the client device. The advantage of this method is that it can be implemented on any computer system that is connected to any display monitor that is capable of displaying an on/off light, such as a Cathode Ray Tube (CRT) or Liquid Crystal Display (LCD).

BACKGROUND OF THE INVENTION

The use of portable information devices is growing and the number of applications for such devices continues to expand. Examples of such devices include portable electronic devices such as personal digital assistants (PDA's), smart phones, electronic organizers, video game units, watches, digital music players, video players, and laptop computers. The corresponding growth in networked computers, and in particular the rapid expansion of commercial use of the Internet, is spurring the proliferation of portable information devices which in turn highlights the need to download data to these devices. For example, one may wish to download the latest software update to a video game or digital music selections from the Internet. The Internet refers to the network of computers that arose out of the network created by the Advanced Research Projects Agency (ARPA) using the transmission control protocol/Internet protocol (TCP/IP) as the method for providing communication between the computers on the network. A number of service facilities have been developed to access and transfer information across the Internet and one of the most popular is known as the World Wide Web (WWW). Typically, a user would access data on the WWW by interfacing with software known as a Web browser, running on a client computer that is connected to the Internet. Alternatively, one may wish to download calendar information from the computer at the office, and later download airline schedules from a kiosk at the airport using a PDA. In this example, the network of computers at the office and the network to which the kiosk is connected at the airport may each be separate, internal and private to an organization with restricted accessibility. Such a private network is often referred to as an Intranet, as compared to the relatively more accessible Internet. Thus, it would be desirable to be able to download information to a variety of portable electronic devices in a wide variety of situations on both the Internet or a private Intranet.

Information that is stored on a computer system can be transferred to another computer or device using a variety of communication methods. The information is transmitted in the form of binary data according to one of a variety of standard schemes using either serial or parallel encoding methods. Such methods may include protocols for handshake procedures, starting, stopping, and error detection and correction. Loading software or data from a host computer system to an external device typically requires either a wired connection between the host computer and the external device, or possibly a wireless connection using an infrared or radio frequency (RF) port, which both require specialized hardware not only on the client device, but also on the host system. This requirement for additional hardware on both the host and client restricts the flexibility of the data transfer and may be difficult to accommodate in some, perhaps remote, locations. Therefore there is a need for a wireless transfer method that does not require matching hardware or hardwired connections, in order to increase the flexibility and usability of portable information devices.

One technique of downloading data that does not require hardwired connections is disclosed in U.S. Pat. No. 5,488,571 entitled "Method and Apparatus for Downloading Information from a Controllable Light Source to a Portable Information Device," issued to Jacobs et al. on Jan. 30, 1996 (hereinafter referred to as the Jacobs patent). The Jacobs patent describes a method and apparatus for transferring data from a CRT display on a personal computer to a multifunction electronic wristwatch. In the Jacobs patent, the data is formatted as a serial bit stream, and the bit stream is then displayed in the form of lines of varying brightness on a CRT display in accordance with the raster refresh rates of the CRT display. The data is transferred to an electronic watch through the use of a photo sensor which detects the light pulses displayed on the CRT as binary data in accordance with timing information associated with the raster scan rate of the CRT. The Jacobs patent is therefore limited to the use of CRT displays and cannot be used with other types of displays such as LCD displays because timing information is dependent on the raster scan rate of the CRT. In addition, the Jacobs patent is also limited to using a serial transmission scheme.

SUMMARY OF THE INVENTION

It is an object of the present invention to provide a method of information transfer from a host computer system to a portable client information device that enables optical data transmission through the use of display monitors in a manner that is independent of the type of display monitor.

It is another object of the present invention to provide a method of information transfer from a host computer system to a portable device that can be utilized in conjunction with the Internet or other computer networks.

It is another object of the present invention to provide a method of information transfer that can accommodate a variety of communications protocol standards, and transmit data using either serial or parallel encoding schemes.

According to the present invention, a method is provided for performing optical data transmission to a portable information device, said method comprising the steps of:

(a) encoding the source data to be downloaded into a data bit stream;

(b) generating a clocking bit stream representing timing pulses;

(c) displaying said clocking bit stream by illuminating a first set of pixels sequentially in accordance with said timing pulses, and displaying said data bit stream by illuminating another set of pixels synchronously with said clocking bit stream so that a bit of data is displayed during the same period of time that a timing pulse is displayed; and (d) detecting the light pulses displayed on the screen using an optical sensing device that is configured to separately detect the illumination of said sets of pixels, converting said light pulses into decoded data and storing the decoded data within the portable information device.

Thus, according to a preferred embodiment of the present invention, a user who desires to download data accesses a host computer via a Web browser thereby invoking a program (such as an applet running in conjunction with the browser environment) to display a regulated series of light pulses which represent a bit stream of data being downloaded. In this embodiment, step (c) of displaying the bit stream data is implemented using a color monitor capable of displaying three primary colors such as red, green, and blue (RGB) whereby each primary color is activated by a separate video signal. The color of a given picture element (pixel) of a display screen is achieved generally by an appropriate combination of the relative brightness of RGB dots as known by those skilled in the art. The transmission of data according to the present invention is accomplished by illuminating the pixels comprising one primary color within a prescribed area of the display screen at intervals of time in accordance with the clocking bit stream (in other words, a series of light pulses), and similarly illuminating a different set of pixels within the same prescribed area comprising another primary color so that a bit of data information is displayed during the time increment in which a clocking light pulse is illuminated. The prescribed area in which the light pulses are displayed is referred to hereinafter as an "Optical Zone" (OZ). One color (for example, blue) is used as a clock synchronization pulse. A remaining primary color (for example, red) is used to display light pulses representing a data bit stream. The third remaining color, green in this example, could be used to display another data bit stream. Thus, each separately illuminated colored set of pixels acts effectively as an individual transmission "channel." Step (d) of detecting the light pulses is performed by an optical sensing device that is connected to the portable information device and is configured to detect each primary color separately and concurrently.

The present invention also provides for a plurality of Optical Zones (OZ's), such that two or more OZ's are formed. Each OZ is used to display a separate output bit stream, and each bit stream is displayed in the form of optical pulses which are synchronized according to the clocking bit stream. Thus a collection of two or more optical zones will hereinafter be referred to as an "Optical Zone Multiple Output Neighborhood" (OZMON). The present invention allows for the possibility of using a parallel transmission scheme to encode the data. For example, two colors within a first optical zone may be used to encode the two data bit streams according to a parallel transmission scheme that uses two data channels. By adding another OZ to form an OZMON, the two colors within the first optical zone may be used in combination with each of the three colors in each additional output neighborhood as separate additional parallel data transmission channels, thus increasing the effective transmission bandwidth. The optical sensing device used to detect the light pulses would be configured to detect each primary color separately and concurrently within each OZ of the OZMON.

An alternative embodiment is applicable if the display monitor is a monochrome display capable of illuminating only pixels of one color as a result of having only one input video signal. An OZMON comprising two or more OZ's is used to display the light pulses. A first OZ is dedicated to the display of the clocking bit stream, and the remaining one or more OZ's of the OZMON are used to display data bit stream light pulses. Correspondingly, the optical sensing device is configured to detect the light pulses from each OZ separately and concurrently.

Another alternative embodiment of the present invention uses a serial transmission scheme in step (a) of encoding the source data into one data bit stream. In the case of a color display monitor, this embodiment utilizes a single OZ and uses only two primary colors as transmission channels. In the case of a monochrome display, this embodiment utilizes an OZMON comprising two OZ's, a first optical zone dedicated to the clocking bit stream, and the second optical zone dedicated to the data bit stream. This embodiment provides for sensing device used in step (d) that has a minimum configuration.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

DESCRIPTION OF THE PREFERRED EMBODIMENTS

Figure 1:
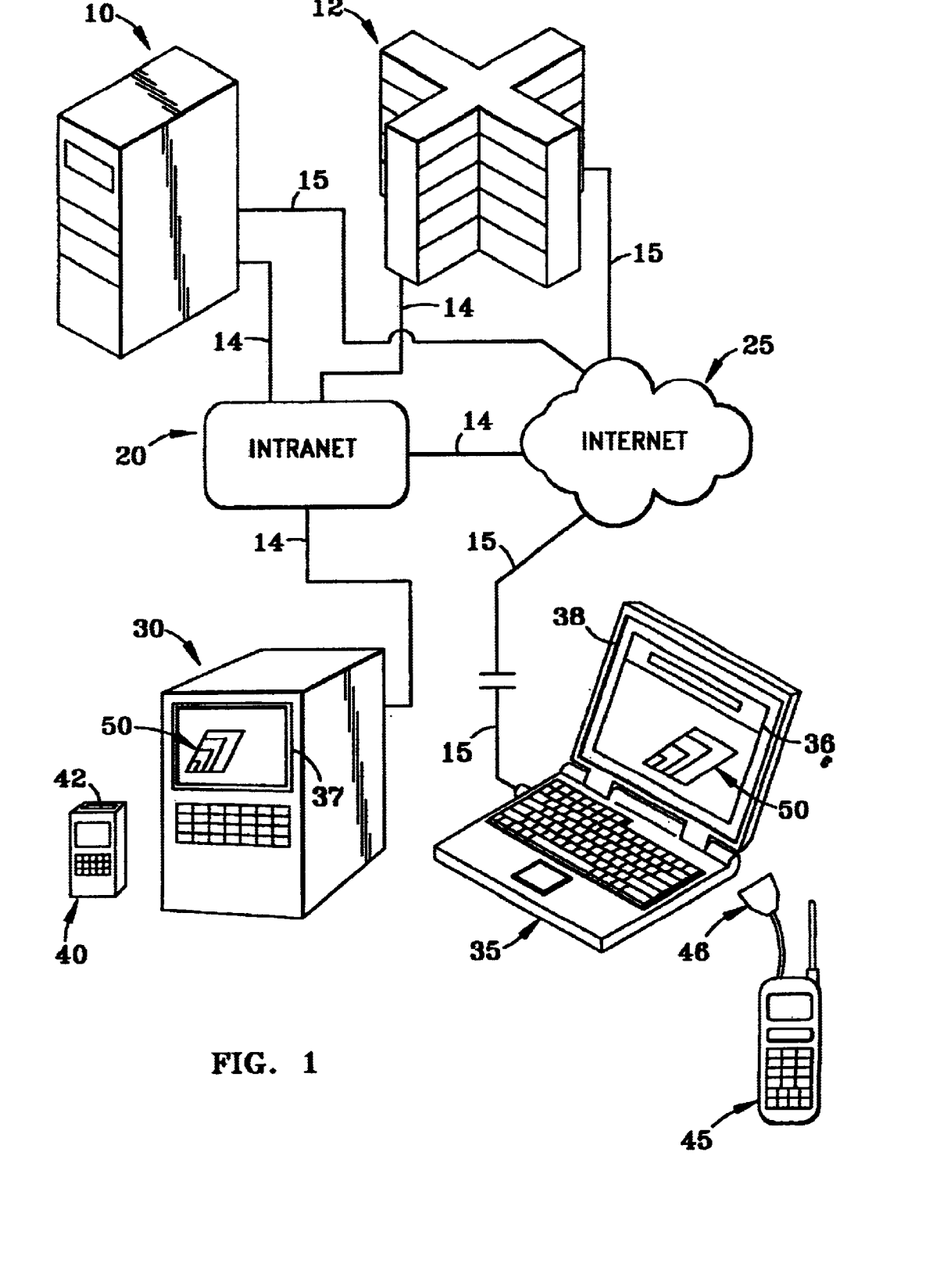
FIG. 1 is a schematic showing several host computer systems connected to a variety of display monitors, from which data may be transmitted to a portable information device.

FIG. 1 schematically illustrates transmission of bit stream data from a host computer system such as a workstation server 10 or mainframe computer system 12, to a portable information device such as a PDA 40 or a smart phone 45, or any number of other similar devices. The data to be transmitted is displayed in the form of optical light pulses within a prescribed area 50 on an LCD display monitor 38 or a CRT display monitor 37 which is connected to a local computer system. The prescribed area 50 is a region of pixels, referred to herein as an Optical Zone (OZ), that are illuminated to display bit stream data in accordance with the present invention. The source data to be transmitted may initially reside on any computer accessible through a network such as a private intranet 20 or the publicly accessible Internet 25, or may reside on a local computer system (for example, the data may initially reside within a kiosk 30 that includes a computer, or reside locally on a laptop computer 35). The connections may include dedicated lines 14. Alternatively, temporary connections 15 to the Internet or an intranet may be made through the use of a modem device, which is a typical way of connecting a computer system such as a laptop computer 35 to the Internet. According to this invention, an optical sensing device 42 or 46, which is connected to the portable information device, is configured so that the optical pulses within the OZ 50 may be conveniently detected. The appropriately configured optical sensing device 42 or 46 may be held, or temporarily affixed (for example, as used in existing applications, using suction cups) to the display monitor 37 or 38 in close proximity to the OZ 50. By means of a computer program, the OZ may be displayed on either a CRT display monitor 37 such as might be connected to a kiosk 30, or an alternative type of display monitor, such as an LCD display 38, which might be connected to a laptop computer 35. According to one preferred embodiment of this invention, in the case of a computer 35 connected to the Internet 25, an OZ 50 may be displayed by a small program, or applet, running within the frame of a browser application 36. Such an applet may be written in any of a variety of programming languages, such as JAVA®. JAVA®, a trademark of Sun Microsystems, Inc., is an object-oriented, platform-independent programming environment. One way that JAVA® platform independence is achieved is by embedding the JAVA® run-time environment, known as the JAVA® virtual machine (JVM® is a trademark of Sun Microsystems, Inc.), within a Web browser. JAVA® programs are compiled in byte format, which may be downloaded from a server and then interpreted by the JVM® running within the Web browser. Thus, an embodiment using a JAVA® applet has the flexibility of being available from any computer system having a JAVA®-enabled Web browser and connected to the Internet.

Figure 2:
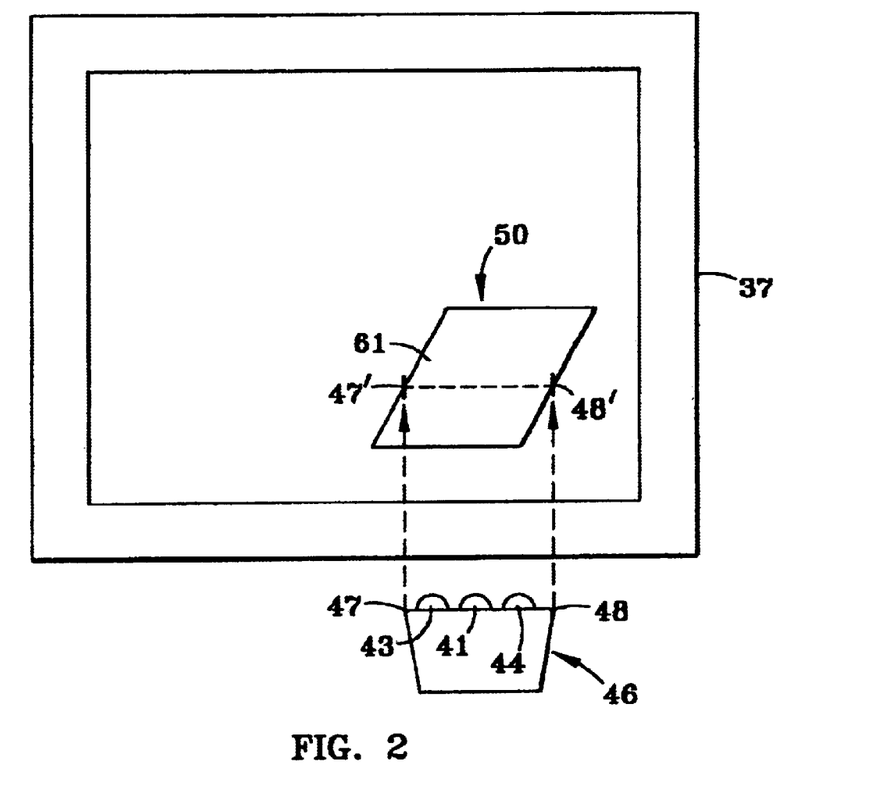
FIG. 2 shows a display,monitor including a displayed optical zone in accordance with the present invention.
Figure 3:
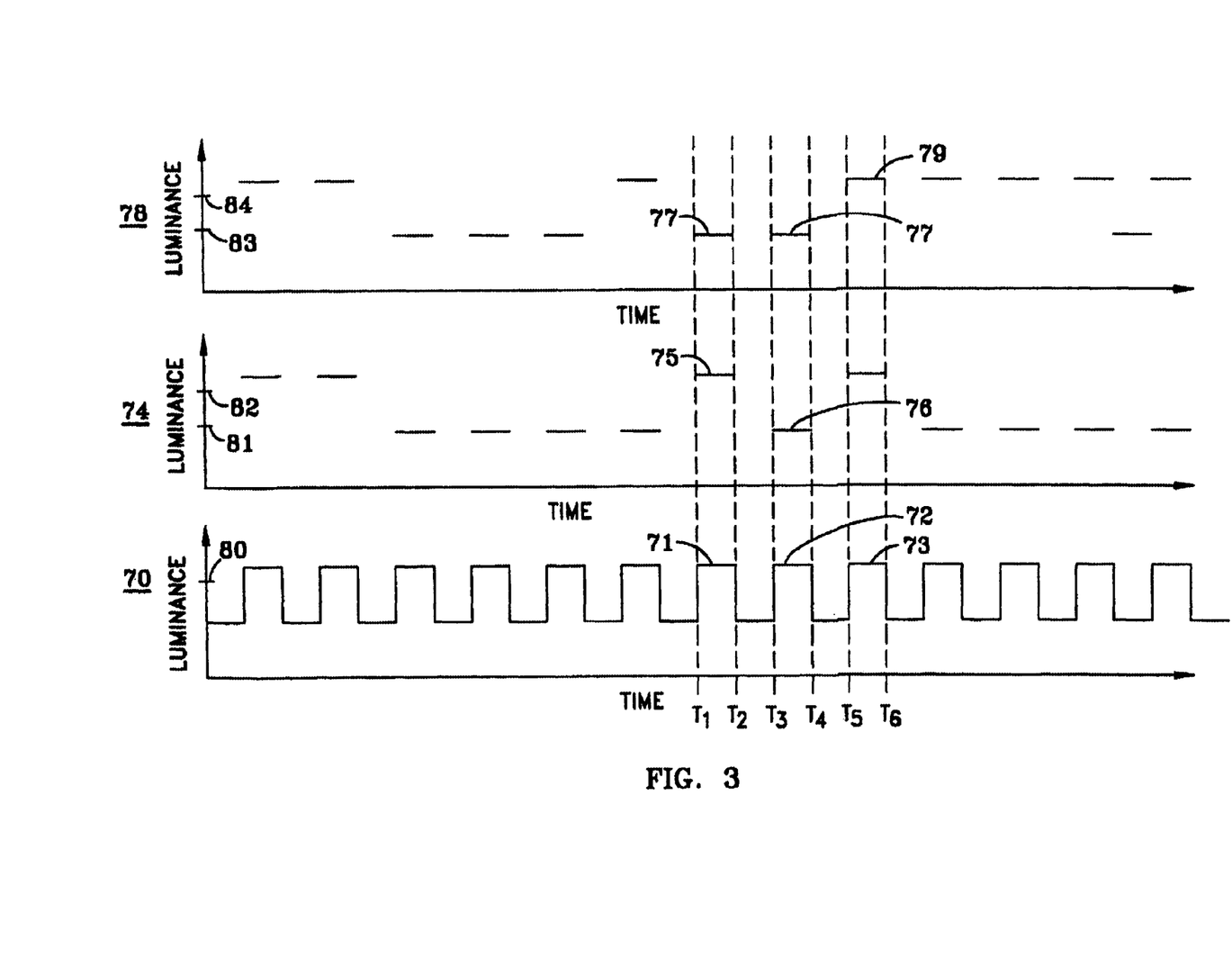
FIG. 3 is a schematic of three bit streams comprising a timing pulse and two data bit streams which could be displayed within an optical zone in accordance with the present invention.

FIG. 2 shows a preferred embodiment of an OZ 50 displayed on the screen of a color CRT display monitor 37, but it could also represent the screen of a color LCD display monitor 38 (see FIG. 1). A color display monitor is typically capable of displaying colors (such as RGB) by illuminating pixels for three primary colors at appropriate brightness (luminance) values. The brightness of each primary color is activated by a separate video signal for that primary color through connections from the computer system to the display monitor. In this embodiment, the OZ 50 is formed within the area of a parallelogram, although the shape of an OZ is not limited to a parallelogram. The significance of using an OZ in the shape of a parallelogram will be described below in the context of another embodiment. The interior portion of the OZ 50 is an area 61 in which at least two of three primary colors is illuminated sequentially according to a sequence as illustrated in FIG. 3. In FIG. 3, a time series of optical pulses are represented, preferably generated by a computer program. The time series 70 represents timing or clocking pulses, and displayed within the OZ 61 of FIG. 2, using the primary color blue. A second time series of optical pulses 74 is generated which represents a bit stream of data and displayed within the same OZ 61, but using a different primary color than the one used for clocking. In this example, the second primary color is chosen to be red. Bit values may be represented by appropriate brightness or luminance values. For example, considering the time series 70, a time during which the luminance value 71 of blue light equals or exceeds a blue threshold value 80 from time T1 until approximately time T2 would represent a clock pulse indicating that a bit of data is being transmitted via another primary color displayed during the same time interval. Thus, referring to time series 74, a bit value of 1 is represented by a red pulse 75 having a luminance value exceeding an appropriate red upper threshold value 82 between time T1 and time T2 during which the luminance value of blue light 71 equals or exceeds a blue threshold value 80. Similarly, a bit value of 0 would be represented by a red pulse 76 with a brightness value below an appropriate red lower threshold value of 81 between time T3 and time T4 during which the luminance value of blue light 72 equals or exceeds the blue threshold value 80. In this embodiment, the data encoded in the red bit stream 74 uses a serial transmission scheme, which is known by those skilled in the art. Thus, each of the two colors effectively represents a transmission channel, in which blue provides a clocking channel and red provides a serial data channel.

Again referring to FIG. 2, the step of detecting and downloading is performed using an optical sensing device 46 connected to a portable information device (40 or 45 as in FIG. 1 but not shown in FIG. 2). In accordance with the present invention, the sensing device 46 is configured such that the blue and red colored series of light pulses displayed within the OZ 50 are detected separately and concurrently. In one embodiment, the sensing device 46 includes a first optical sensor 43 capable of detecting luminance of blue light, and a second optical sensor 44 capable of detecting luminance of red light. Optical sensors capable of detecting individual colors are known to those skilled in the art. In accordance with the present invention, the blue and red light pulses are detected separately and concurrently by optical sensors 43 and 44, respectively, when the sensing device 46 is positioned in proximity to the screen as, for example, when corners 47 and 48 of the sensing device 46 are positioned approximately as indicated by the dotted line connecting points 47' and 48' located on the screen of the display monitor 37.

Figure 4:
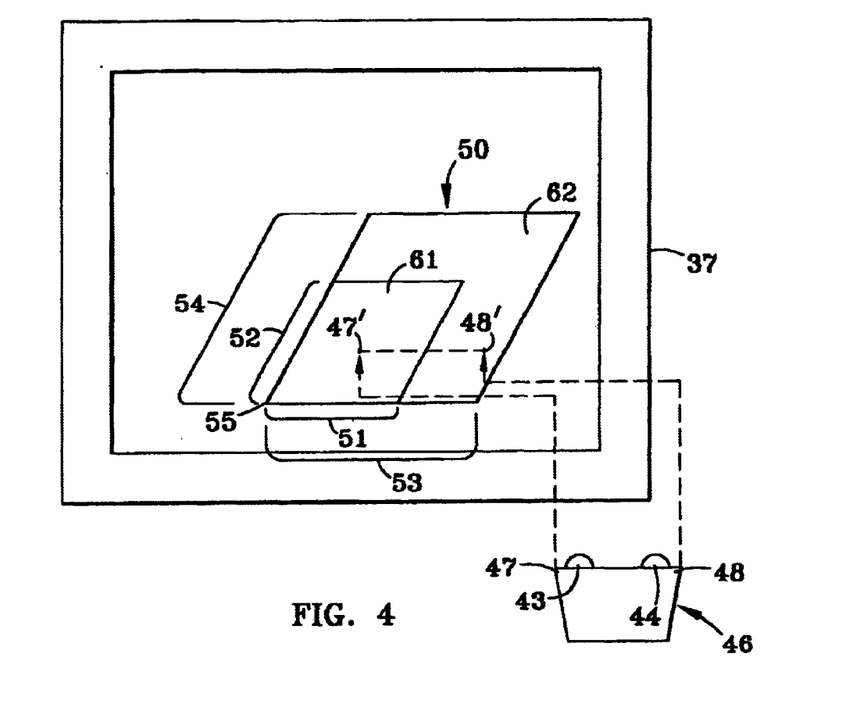
FIG. 4 shows a display monitor including a multiple output neighborhood (OZMON) in accordance with the present invention comprising two optical zones.

Assuming, as above, that the data bit stream is encoded using a serial transmission scheme, an alternative embodiment of the present invention is illustrated in FIG. 4, which is applicable when the display monitor 37 is a monochromatic display monitor capable of controlling the brightness of only one color. An area of the screen 50 is formed in the shape of a parallelogram and comprises two optical zones. The first optical zone (OZ) 61 is enclosed within a small parallelogram with sides shorter, and approximately one half the length of the corresponding sides of the larger parallelogram 50. The parallelogram forming OZ 61 is positioned within the larger parallelogram 50 so that one corner point 55 of OZ 61 is coincident with a corner point 55 of the parallelogram 50, and first edge 51 of the parallelogram 61 extends from the coincident corner point 55 along the first edge 53 of the larger parallelogram 50, and a second edge 52 of parallelogram describing the first OZ 61 extends along the second edge 54 of the larger parallelogram 50. Alternatively, one can form the larger parallelogram 50 by extending the sides of an initial parallelogram enclosing the area 61 by extending sides 51 and 52 to approximately twice the original lengths (53 and 54 respectively) to form a similar larger parallelogram having a common corner 55. Thus, a second optical zone 62 is formed comprising the area enclosed by the larger parallelogram 50, but not including the area covered by the first OZ 61. The shape of the area defined by the remainder of the area of a larger parallelogram after removal of a smaller, similar parallelogram having a common corner point with the larger parallelogram, is known as a gnomon in the field of mathematics. In this embodiment, the timing bit stream (70 in FIG. 3) is displayed as a series of monochromatic light pulses illuminating the first OZ 61 and the data bit stream (74 in FIG. 3), encoded using a serial transmission scheme, is displayed synchronously with timing bit stream 70 as a series of monochromatic light pulses illuminating the second OZ 62 formed in the shape of a gnomon. The detection of the bit stream data may be performed using a sensing device 46 attached to a portable information device (not shown). The sensing device 46 comprises two optical sensors 43 and 44 (known by those skilled in the art), which are capable of separately and concurrently detecting the individual light pulses from each OZ 61 and 62 when the corners 47 and 48 of the sensing device is positioned in proximity to points 47' and 48', respectively, on the display monitor 37. This embodiment introduces the concept of using a plurality of optical zones for displaying multiple output bit streams. The optical zones according to the present invention are not required to be contiguous, but preferably are formed within a neighborhood of each other. Thus, the plurality of output optical zones according to the present invention may be referred to as an "Optical Zone Multiple Output Neighborhood" (OZMON). Therefore, in FIG. 4, the area 50 is an OZMON comprising a first OZ 61 in the shape of a parallelogram and a second OZ 62 in the shape of a gnomon. For the case of a monochrome display monitor as in this embodiment, the first OZ 61 provides the timing bit stream information, while the second OZ 62 provides the data bit stream information, encoded according to serial transmission.

The present invention may also be implemented by encoding the data bit stream using a parallel transmission scheme, as known by those skilled in the art. In the case of an embodiment using a color display monitor and displaying a single OZ 50 in FIG. 2 in which one primary color, say blue, is used as to display the timing bit stream, the two remaining primary colors may be used to display a red data bit stream 74 and a green data bit stream 78. As previously described, in the red time series 74, a bit value of 1 or 0 is determined based on luminance values relative to red threshold values 81 or 82 during time intervals for which the luminance value of blue light (for example 71, 72, and 73) equals or exceeds a blue threshold value 80. Similarly, for a green time series, a bit value of 1 is represented by a green pulse 79 having a luminance value exceeding an upper green threshold value 84 during a given timing interval, illustrated by the interval between time T5 and time T6, and a bit value of 0 would be represented by a green pulse 77 with a brightness value below a lower green threshold value of 83, as illustrated at time interval T1 to T2 and interval T3 to T4. Since the red and green time series effectively provide for two data transmission channels, the data bit stream may be encoded using a parallel transmission scheme in which the data bits are interleaved between the red and green pulses within the same OZ 50, thus providing for an increase in transmission bandwidth over a serial encoding scheme. According to this embodiment, the corresponding sensor device 46 connected to a portable information device (not shown) comprises three optical sensors 41, 43, and 44, so that the three colored time series are detected separately and concurrently.

Furthermore, as shown in FIG. 4, if the display monitor 37 is a color monitor, the OZMON 50 now comprises two color OZ's (61 and 62), each of which may be used to display up to three bit streams totaling up to six bit streams. Thus, an OZMON 50 that comprises two OZ's (61 and 62) is capable of transmitting five channels of bit stream data simultaneously, since one of the colors within one OZ (for example, a first OZ 61) would be used to display the timing bit stream. The sensing device 46 would correspondingly comprise two groups of three sensors each, where a first group 43 of three sensors is configured to detect the three separate color-coded bit streams illuminated in the first OZ 61, and a second group of three sensors 44 is configured to detect the three color-coded bit streams illuminated in the second OZ 62, and each group of sensors detects the bit streams from each OZ concurrently. Because color display monitors are in common usage today, this is a preferred embodiment of the present invention which provides for flexibility, reasonable bandwidth for data transmission, and reasonable sensing device configuration.

Figure 5:
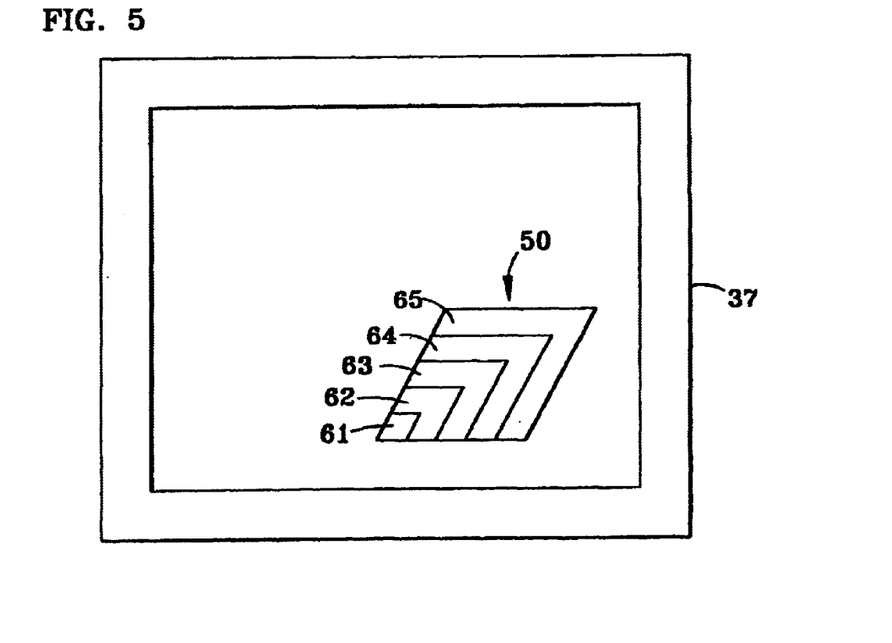
FIG. 5 shows a display monitor including a multiple output neighborhood (OZMON) of the present invention comprising five optical zones.

Additional embodiments of the invention may be created by using an OZMON comprising a greater number of OZ's, as for example, the OZMON 50 of FIG. 5 which contains five OZ's 61, 62, 63, 64, and 65, in which a first OZ 61 is formed in the shape of a parallelogram, and the additional OZ's (62, 63, 64, and 65) are formed as gnomons such that the co-linear sides of each OZ are approximately equal in length. A sensing device (42 or 46 of FIG. 1) connected to a portable information device (40 or 45 of FIG. 1) must be suitably configured so that it can be positioned conveniently to detect the light pulses illuminating the OZ's 61, 62, 63, 64, and 65 of the OZMON 50. The embodiment illustrated in FIG. 5 in which the display monitor 37 is a color monitor, would be capable of transmitting up to 14 channels of data bit stream information, plus one channel of clocking information.

Figure 6A:
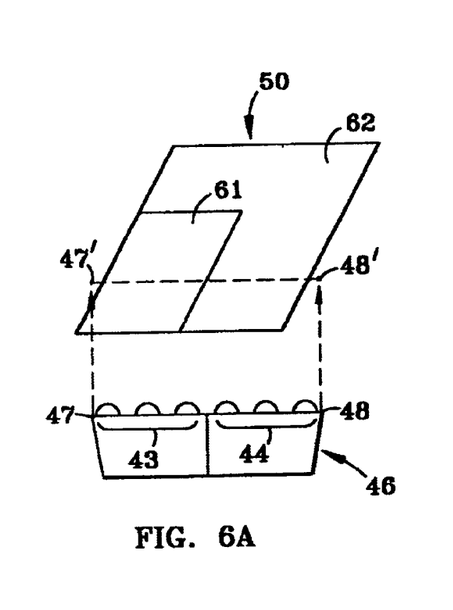
FIG. 6A shows a sensing device positioned approximately horizontally with respect to a multiple output neighborhood (OZMON) in accordance with the present invention in order to detect light pulses displayed on a low-resolution screen.
Figure 6B:
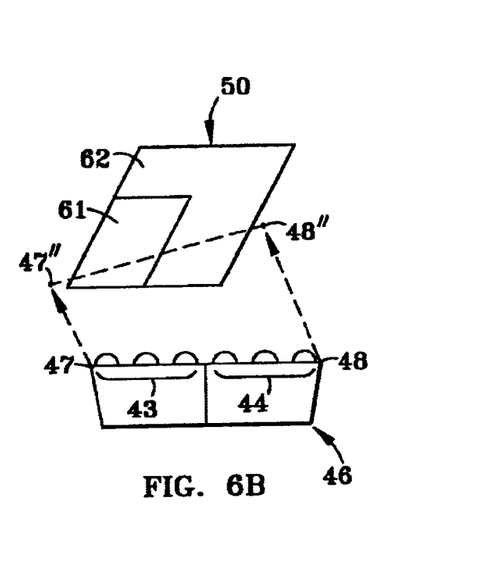
FIG. 6B shows the orientation of a sensing device positioned to detect light pulses from the multiple output neighborhood (OZMON) of FIG. 6A, but displayed on a high-resolution screen, with the sensing device rotated until the width of the sensing device approximately matches the size of the optical zones of the displayed OZMON.

Referring now to FIGS. 6A and 6B, the preferred embodiment of an OZMON 50 is in the shape of a parallelogram. Assuming that the OZMON 50 is comprised of a first OZ 61 and a second OZ 62, according to a preferred embodiment, the sensor device 46 is configured with two groups of optical sensors in a linear configuration such that the first group of sensors 43 can be positioned to align with and detect the light pulses illuminated within the first OZ 61, and also so that the second group of sensors 44 can be aligned with and concurrently detect the light pulses illuminated within the second OZ 62. For example, as in FIG. 6A, it may be convenient to align the sensing device essentially horizontally so that the edges of the sensing device 47 and 48 are positioned approximately as indicated by the dotted line connecting the positions 47' and 48' respectively. However, in a preferred embodiment, the OZMON 50 is formed by illuminating a fixed number of pixels. For example, on a screen with a pixel resolution of 640×480, an OZ in the shape of a parallelogram having a horizontal side one inch in length would be formed by illuminating approximately 640 pixels horizontally. However, when the same OZ is displayed on a screen with a pixel resolution of 1024×768, the length of a horizontal side of the parallelogram formed by illuminating 640 pixels will be smaller by a factor of about 1.6, and have a length of approximately 0.625 inches. Therefore, an optical zone defined in terms of an fixed number of pixels would have different sizes dependent on the pixel resolution and physical dimensions of the display screen being used. Since it may be inconvenient or impractical to determine the screen resolution in a typical application, a preferred embodiment of the present invention would not require knowledge of the display resolution. The overall parallelogram shape of the OZMON 50 allows convenient alignment of the optical sensing device to the OZ's (61 and 62) on screens having different pixel resolutions. For example, if the OZMON 50 in FIG. 6A was displayed on a screen with pixel resolution of 640×480, it would be smaller by a factor of about 1.6 when displayed on a screen with pixel resolution of 1024×768 as illustrated in FIG. 6B. In this case, the preferred alignment of the sensing device 46 relative to the OZMON 50 would be obtained by rotating the sensing device 46 so that its corners 47 and 48 are aligned according to the position indicated by the dotted line connecting points 47" and 48", respectively. This allows the first group of sensors 43 to align with and detect optical pulses displayed in the first OZ 61 and the second group of sensors 44 to align with and detect (concurrently with the first group of sensors 43) optical pulses displayed in the second OZ 62. The present invention is not limited to the use of parallelograms for the shape of the OZMON 50, nor limited to a linear configuration for the sensor device 46.

Figure 7:
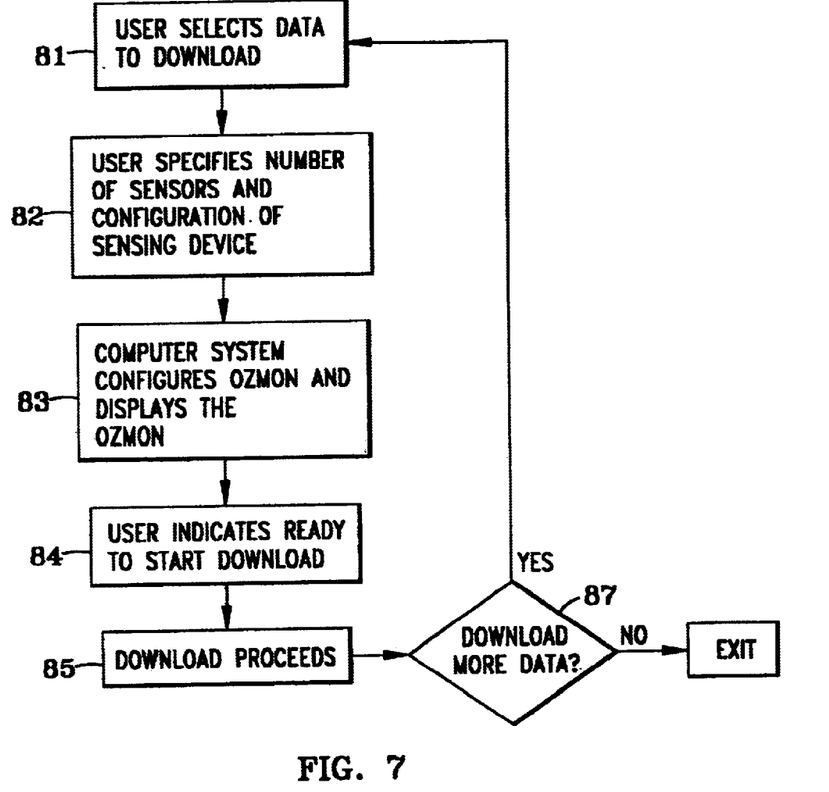
FIG. 7 shows a flow chart of a program running on a computer system causing bit streams to be displayed in accordance with the present invention.
Figure 8:
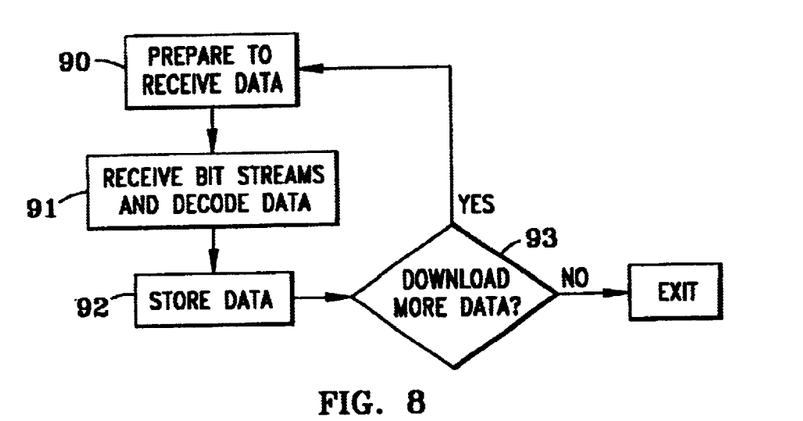
FIG. 8 shows a flow chart of a program running on a portable information device causing the conversion of optically detected bit stream data and the storage of said data within the portable information device.

In a preferred embodiment of this invention, the program to display the data transmission within an optical zone is implemented as a JAVA® applet, which has the advantage of being portable and accessible through a Web browser while connected to the Internet. An overall flow chart of such a JAVA® program is shown in FIG. 7. The program presents the user with a menu (Block 81) from which the user may select a source data set to download. The program also asks the user for input (Block 82) regarding the configuration of the sensing device. The program then instructs the computer to provide the user with a visual display (Block 83) of the optical zone or zones comprising the OZMON and waits for a response (Block 84) from the user. When the user has aligned the sensing device in accordance with the displayed OZMON, the user indicates a response (Block 84), and the program proceeds to generate and display bit stream information according to the method of the present invention (Block 85). Finally, the user is provided with an indication that the download is completed and is given an option to download additional data or exit (Block 87). A corresponding program runs within the portable information device in order to download, decode, and store the information being transmitted. A flow chart for this program is illustrated in FIG. 8. The portable information device waits for the user to indicate that a download is about to commence (Block 90). Once the user so indicates, the program decodes the bit stream data received from the attached sensing device (Block 91), and appropriately stores (Block 92) the decoded data within a computer usable medium included with the portable information device. Finally, the program waits for a response from the user (Block 93) when the download is completed.

While the invention has been particularly described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

We claim:

1. A method for transferring information from a host computer system having a storage device for storing data, the host computer system having a connection to a display monitor having a screen, said method comprising the steps of:

generating a clocking bit stream of optical pulses at approximately regularly spaced time intervals;

converting a source data set residing on the storage device into a data bit stream of optical pulses;

forming a predefined area on the screen of the display monitor, said redefined area comprising a plurality of regions;

displaying said clocking bit stream of optical pulses by illuminating one of said plurality of regions in accordance with said approximately regularly spaced time intervals;

displaying said data bit stream of optical pulses by illuminating another of said plurality of regions different from the one displaying said clocking hit stream so that a bit of said data bit stream is displayed approximately synchronously with illumination of said clocking bit stream;

detecting said optical pulses using a sensing device, said sensing device being connected to a portable information device and said sensing device configured so as to detect said clocking bit stream and said data bit stream separately and concurrently;

converting said optical pulses of said data bit stream into a target data set in accordance with said clocking bit stream; and storing the target data set within the portable information device.

2. The method of claim 1, wherein said predefined area is defined by a parallelogram wherein a first of said plurality of regions is defined by a smaller parallelogram having one corner coincident with a corner of said predefined area and having two sides extending from the coincident corner that are co-linear with two sides of said predefined area, and each remaining region of said plurality of regions is has the shape of a gnomon, and said sensing device is configured as a linear array of detectors so that when one end of said line array is aligned with said first of said plurality of regions in the shape of said smaller parallelogram and the remaining detectors of said linear aa are aligned with said remaining regions that have the shape of a gnomon, said clocking bit stream and said data bit stream displayed within each of said plurality of regions are detected separately and concurrently during said step of detecting.

3. The method of claim 2, wherein the display monitor is a monochromatic display device.

4. The method of claim 3, wherein said step of converting a source data set is performed using a serial transmission scheme so that said data bit stream comprises a single data time series of optical pulses; and said step of displaying further includes displaying said clocking bit stream within said first region; and displaying said data bit stream within said remaining region, wherein the sensing device is configured such that said clocking bit stream and said data bit stream are each detected separately and concurrently.

5. The method of claim 3, wherein said step of converting a source data set is performed using a parallel transmission scheme so that said data bit stream comprises a plurality of data time series of optical pulses; and said step of displaying further includes displaying said clocking bit stream within said first region; and displaying each of said plurality of data time series separately and concurrently within separate remaining regions, wherein said sensing device is configured such that said clocking bit stream and said plurality of data time series are each detected separately and concurrently.

6. The method of claim 1, wherein the display monitor is a color display device capable of displaying three primary colors separately and concurrently, wherein within said clocking bit stream is displayed by illuminating one primary color in said step of displaying said clocking bit stream, said displaying said data bit stream further comprises illuminatng a remaining primary color within said one of said plurality of regions displaying said clocking bit stream, and said sensing device is configured so that said bit streams comprising separate primary colors are detected separately and concurrently.

7. The method of claim 6, wherein said step of converting a source data set is performed using a serial transmission scheme so that said data bit stream comprises a single data time series of optical pulses.

8. The method of claim 6, wherein said step of converting a source data set is performed using a parallel transmission scheme so that said data bit stream comprises a plurality of data time series of optical pulses.

9. The method of claim 2, wherein the display monitor is a color display device capable of displaying three primary colors separately and concurrently, wherein within said clocking bit stream is displayed by illuminating one primary color in said step of displaying said clocking bit stream, said displaying said data bit stream further comprises illuminating a remaining primary color within said one of said plurality of regions displaying said clocking bit stream, and said sensing device is configured so that sad bit streams comprising separate primary colors are detected separately and concurrently.

10. A computer program product having
instructions for performing a method for transmitting bit stream data, the method comprising the steps of:
  generating a clocking bit stream of optical pulses that represent approximately regularly spaced time intervals;
  converting a source data set into a data bit stream of optical pulses;
  forming a predefined area on a screen of a display monitor, said predefined area comprising a plurality of optical zones;
  displaying said clocking bit stream of optical pulses by illuminating one of said plurality of optical zones in accordance with said approximately regularly spaced time intervals;
  displaying said data bit stream of optical pulses by illuminating another one of said plurality of optical zones different from the one displaying said clocking bit stream so that a bit of said data bit stream is displayed approximately synchrously with illumination of said clocking bit steam; and
displaying said clocking bit stream and said data bit stream so that an optical pulse of said data bit stream is displayed synchronously with a pulse of said clocking bit stream within an optical zone, said optical zone comprising a plurality of pixels within a geometrically defined area on the screen of the display monitor.

11. The method of claim 10, wherein said predefined area is defined by a parallelogram, wherein a first region of said plurality of regions is defined by a smaller parallelogram having one comer coincident with a comer of said predefined area and having two sides extending from the coincident corner that are co-linear with two sides of said predefined area, and each of the remaining regions of said plurality of regions are formed in the shape of gnomons, and said sensing device is configured as a linear array of detectors so that when one end of said linear array is aligned with said first of said plurality of region in the shape of said smaller parallelogram and the remaining detectors of said linear array are aligned with said remaining regions that have the shape of a gnomon.

12. The computer program product of claim 10, or 11, wherein said instructions for performing the method comprise a JAVA® applet program, so that said JAVA® applet may be downloaded to a computer system having a JAVA®-enabled Web browser.

13. A system for transferring a source data set from a host computer system having a connection to a display monitor, to a portable information device, said system comprising:
  a first computer readable storage medium having stored therein first instructions for causing the host computer to convert the source data set into a data bit stream and to display said data bit stream on the display monitor concurrently with a clocking bit stream within a predefined area of the display monitor, said predefined area comprising a plurality of optical zones, wherein said predefined area is defined by a parallelogram, wherein a first of said plurality of optical zones is defined by a smaller parallelogram having one corner coincident with a corner of said predefined area and having two sides extending from the coincident corner that are co-linear with two sides of said predefined area, and each of the remaining optical zones are formed in the shape of gnomons; an optical sensing device configured as a linear a of detectors so that when one end of said linear array is aligned with said first of said plurality of optical zones in the shape of said smaller parallelogram and other detectors of said linear array are aligned with said remaining optical zones that have the shape of a gnomon, said data bit stream and said clocking bit stream are detected separately and concurrent when said optical sensing device is positioned in proximity to said predefined area of the display monitor, said optical sensing device being connected to the portable information device; and
  the portable information device including a second computer readable storage medium, and having second instructions for causing the portable information device to convert said data bit stream into a target data set in accordance with said clocking bit stream and storing said target data set onto the second computer readable storage medium.

14. The system as in claim 13, wherein the portable information device includes a client computer, and said second instructions for converting and storing data comprised computer readable program code for causing the client computer to perform a method for converting and storing data, the method comprising the steps of:
  receiving said data bit stream and said clocking bit stream detected by said optical sensing device;
  converting said data bit stream into a target data set in accordance with said clocking bit stream; and
  storing said target data set, within the second computer readable storage medium.

15. The system as in claim 14, wherein said first instructions comprise computer readable program code for causing the host computer to perform a method for converting and displaying data, the method comprising the steps of:
  generating a clocking bit stream of optical pulses that represent approximately regularly spaced time intervals;
  converting a source data set residing on the first storage medium into a data bit stream of optical pulses;

forming a predefined area on a screen of a display monitor;

displaying said clocking bit stream of optical pulses by illuminating a first plurality of pixels within said predefined area in accordance with said approximately regularly spaced time intervals; and displaying said data bit stream of optical pulses by illuminating an additional plurality of pixels within said predefined area so that a bit of said data bit stream is displayed approximately synchronously with illumination of said first plurality of pixels in accordance with said clocking bit stream.

16. The system as in claim 13, 14, or 15, wherein said first instructions comprise a JAVA® applet.

* * * * *